(12) United States Patent
Selan

(10) Patent No.: US 10,802,287 B2
(45) Date of Patent: Oct. 13, 2020

(54) DYNAMIC RENDER TIME TARGETING BASED ON EYE TRACKING

(71) Applicant: Valve Corporation, Bellevue, WA (US)

(72) Inventor: Jeremy Adam Selan, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/367,008

(22) Filed: Mar. 27, 2019

(65) Prior Publication Data

US 2020/0225473 A1 Jul. 16, 2020

Related U.S. Application Data

(60) Provisional application No. 62/792,305, filed on Jan. 14, 2019.

(51) Int. Cl.
| | | |
|---|---|---|
| *G02B 27/01* | (2006.01) | |
| *G02B 27/00* | (2006.01) | |
| *G06F 3/01* | (2006.01) | |
| *G09G 3/22* | (2006.01) | |

(52) U.S. Cl.
CPC ..... *G02B 27/0172* (2013.01); *G02B 27/0093* (2013.01); *G06F 3/012* (2013.01); *G06F 3/013* (2013.01); *G06F 3/017* (2013.01); *G09G 3/22* (2013.01); *G09G 2320/062* (2013.01)

(58) Field of Classification Search
CPC ............. G06T 19/006; G02B 27/0172; G02B 2027/014; G02B 27/0093; G02B 27/017; G02B 2027/0185; G02B 2027/0187; G06F 3/011; G06F 3/013; G06F 3/012; G06F 3/04815; G06F 3/017; H04N 13/366; H04N 13/117; H04N 13/383; H04N 2013/0085; G09G 3/22; G09G 2320/062

See application file for complete search history.

(56) References Cited

U.S. PATENT DOCUMENTS

| | | | | |
|---|---|---|---|---|
| 9,443,355 | B2 * | 9/2016 | Chan | ........................ G06F 3/048 |
| 9,829,710 | B1 * | 11/2017 | Newell | .............. G02B 27/0172 |
| 9,892,565 | B2 * | 2/2018 | Chan | ........................ G06F 3/048 |

(Continued)

OTHER PUBLICATIONS

PCT Search Report and Written Opinion dated Mar. 30, 2020 for PCT Application No. PCT/US20/13441, 18 pages.

*Primary Examiner* — Michael J Jansen, II

(74) *Attorney, Agent, or Firm* — Lee & Hayes, P.C.

(57) ABSTRACT

A head-mounted display (HMD) with a rolling illumination display panel can dynamically target a render time for a given frame based on eye tracking. Using this approach, re-projection adjustments are minimized at the location of the display(s) where the user is looking, which mitigates unwanted, re-projection-based visual artifacts in that "region of interest." For example, logic of the HMD may predict a location on the display panel where a user will be looking during an illumination time period for a given frame, determine a time, within that illumination time period, at which an individual subset of the pixels that corresponds to the predicted location will be illuminated, predict a pose that the HMD will be in at the determined time, and send pose data indicative of this predicted pose to an application for rendering the frame.

20 Claims, 5 Drawing Sheets

(56) References Cited

U.S. PATENT DOCUMENTS

| | | | | |
|---|---|---|---|---|
| 10,142,553 | B2* | 11/2018 | Horesh | H04N 5/23219 |
| 10,212,428 | B2* | 2/2019 | Trepte | G06T 7/70 |
| 10,248,199 | B2* | 4/2019 | Wilairat | G06F 3/011 |
| 10,274,728 | B2* | 4/2019 | Richards | G02B 27/017 |
| 10,520,739 | B1* | 12/2019 | Vlachos | G06T 15/005 |
| 2004/0104935 | A1* | 6/2004 | Williamson | G06F 3/012 |
| | | | | 715/757 |
| 2012/0154277 | A1* | 6/2012 | Bar-Zeev | G02B 27/017 |
| | | | | 345/158 |
| 2015/0002542 | A1* | 1/2015 | Chan | G09G 3/3225 |
| | | | | 345/633 |
| 2016/0219208 | A1* | 7/2016 | Horesh | G03B 17/38 |
| 2016/0238852 | A1* | 8/2016 | Ellsworth | G06F 1/163 |
| 2016/0343315 | A1* | 11/2016 | Richards | G02B 27/017 |
| 2017/0045941 | A1* | 2/2017 | Tokubo | G06F 3/167 |
| 2017/0228855 | A1* | 8/2017 | Bates | G02B 27/0093 |
| 2017/0336867 | A1* | 11/2017 | Wilairat | G02B 27/0093 |
| 2017/0345217 | A1* | 11/2017 | Chan | G06F 3/048 |
| 2018/0047332 | A1* | 2/2018 | Kuwahara | G06F 3/147 |
| 2018/0199039 | A1* | 7/2018 | Trepte | G06T 15/405 |
| 2018/0218543 | A1* | 8/2018 | Vembar | G06F 3/14 |
| 2019/0228700 | A1* | 7/2019 | Selan | G09G 3/3611 |
| 2019/0236834 | A1* | 8/2019 | Blackmon | G06F 3/013 |
| 2019/0236836 | A1* | 8/2019 | Mallinson | G06T 15/20 |
| 2019/0339770 | A1* | 11/2019 | Kurlethimar | G06F 3/011 |
| 2019/0346922 | A1* | 11/2019 | Young | G06F 3/013 |
| 2020/0018978 | A1* | 1/2020 | Vlachos | G02B 27/0189 |
| 2020/0050353 | A1* | 2/2020 | Chiu | G03B 21/14 |
| 2020/0183492 | A1* | 6/2020 | Siddiqui | G06K 9/00 |

\* cited by examiner

DYNAMIC RENDER TIME TARGETING BASED ON EYE TRACKING

CROSS REFERENCE TO RELATED APPLICATION

This application claims priority to commonly assigned, U.S. Provisional Patent Application Ser. No. 62/792,305, filed Jan. 14, 2019. Application Ser. No. 62/792,305 is fully incorporated herein by reference.

BACKGROUND

Virtual reality (VR) systems are used both within and outside of the video game industry. Displays for VR systems, such as those embedded in a VR headset, can operate using various display driving techniques. Some VR systems use a "global flashing" technique to drive the display(s). In the global flashing technique, all of the pixels of the display(s) illuminate in synchronization to present an image on the display(s) for a given frame. Other VR systems use a "rolling band" technique to drive the display(s). In the rolling band technique, rows of pixels are illuminated in sequence (typically from top-to-bottom) to present an image on the display(s) for a given frame. In other words, with the rolling band display driving technique, the illumination propagates (or "rolls") across the display during the presentation of an image for a given frame.

A user of a VR headset that implements the rolling band display driving technique may, when looking at the top or the bottom of the display(s), notice unwanted visual artifacts, such as "judder," with respect to moving or animating objects in those regions. Judder causes the user to perceive a "double ghosting effect" where a moving object—such as a virtual representation of the user's hand moving at the bottom of the display—appears to bounce between two locations (or separate from itself) frame-to-frame. The cause of this unwanted visual artifact near the top and bottom of the display(s) is partly due to the target render time that is provided to the application for rendering a given frame, and partly due to a re-projection step that applies rotational corrections to the application-rendered frame to present an image that is aligned with the most up-to-date estimate of the user's head pose.

Consider a graphics-based application, such as a video game, which outputs rendered frames that are used to present images on the display panel(s) of a VR headset. In order to render the correct scene based on the user's head pose, the application receives, as input, a predicted pose of the user's head. However, with a rasterization-based rendering approach, the application can only accept a single pose (based on a single target render time) as input for rendering the frame in question. This means that a single target render time must be chosen for the original pose prediction of the user's head. One option, in a VR system that uses the rolling band display driving technique, is to choose, as the target render time for every frame, the time when the middle row of pixels will be illuminated. Although this approach is expected to minimize the total amount of re-projection adjustments for the entire frame, it nevertheless fails to mitigate the unwanted judder artifacts that are noticed by the user near the top and the bottom of the display(s) because the user is not always looking at the middle of the display panel(s). In fact, the user's eyes tend to wander about the display panel(s), often gazing at the top or the bottom of the display(s) as the VR headset is used. When the user's eyes stray from the middle of the display to the top or the bottom of the display, for example, the re-projection adjustments that are applied to the pixel values near the top or the bottom of the display(s) can cause noticeable judder artifacts with respect to moving or animating objects in those regions of the display.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
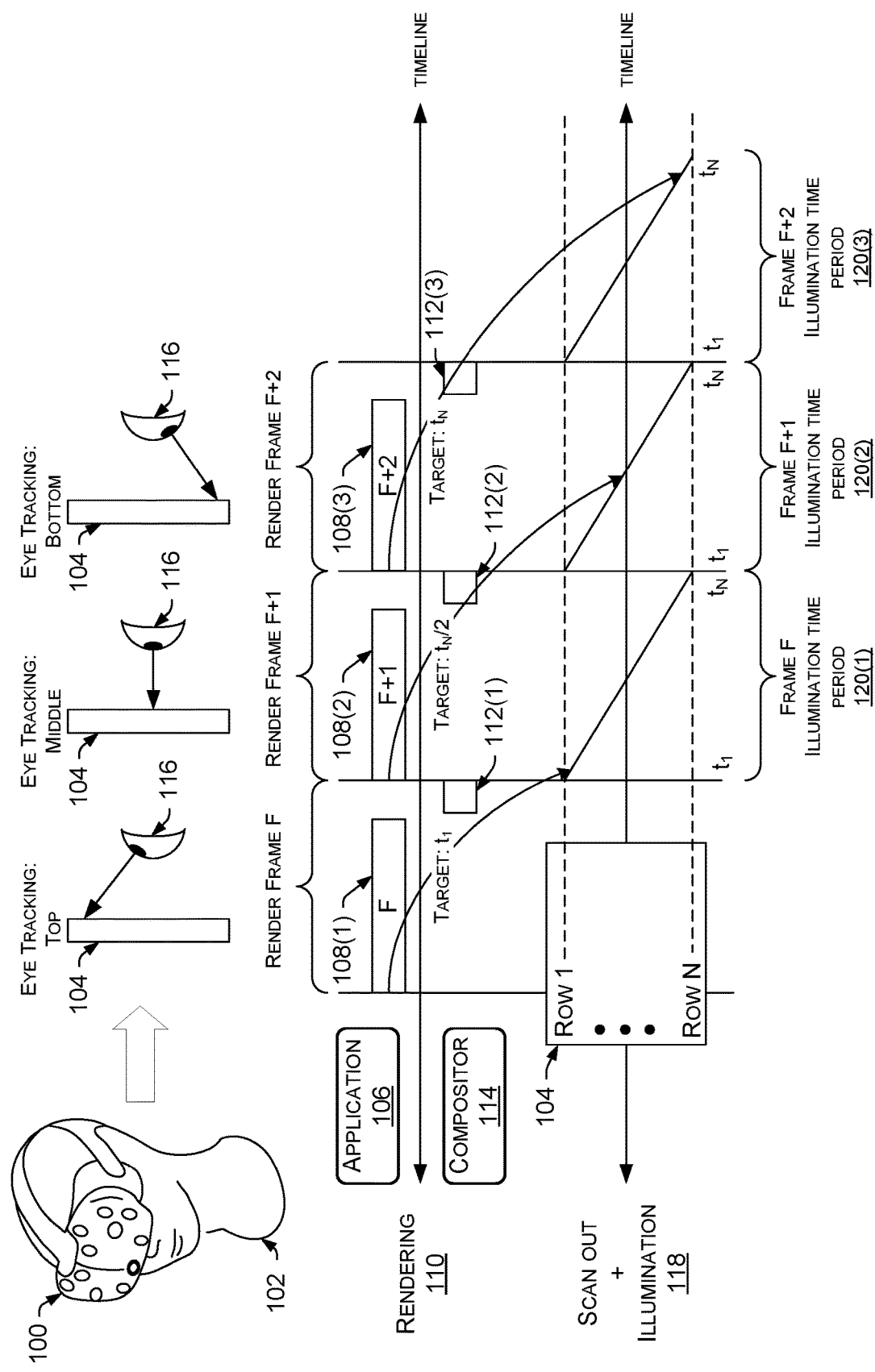
FIG. 1 is a diagram illustrating an example technique for dynamically targeting a render time for a given frame based on eye tracking, in accordance with embodiments disclosed herein.

Described herein are, among other things, techniques and systems, including a head-mounted display (HMD) system, for dynamically targeting a render time for a given frame based on eye tracking and the implied scan out latency for individual subsets of pixels. Using this approach, little-to-no re-projection adjustments are applied to the pixel values at the location of the display(s) where the user is looking during image presentation, which mitigates unwanted, re-projection-based visual artifacts in a "region of interest" where the user is looking. In general, when large-scale re-projection adjustments are applied to an application-rendered frame, the resulting re-projected frame will exhibit unwanted visual artifacts, such as judder, which manifests as a moving or animating object that splits apart into two or more objects, frame-to-frame. By contrast, when small-scale re-projection adjustments are applied to an application-rendered frame, the resulting re-projected frame will mitigate these unwanted visual artifacts caused by re-projection. Thus, with the goal of making as accurate of a prediction as possible to render the frame correctly, and to make as few re-projection adjustments as possible during re-projection, the techniques and systems described herein improve the image quality in the region of interest where the user is looking by virtue of minimizing the re-projection adjustments to the pixel values in the region of interest. This improves the display quality of a HMD that implements a rolling band display driving technique.

In an illustrative example, a HMD may be worn by a user for purposes of immersing the user in a virtual reality (VR)

environment or an augmented reality (AR) environment. One or more display panels of the HMD present images based on frames that are output by an application (e.g., a video game), and these images are viewed by a user through the optics that are included in the HMD, making the user perceive the images as if the user was immersed in a VR or AR environment. The HMD may utilize a rolling band technique to drive a display panel(s) of the HMD by illuminating individual subsets of the pixels in sequence over an illumination time period. Thus, the illumination propagates (or "rolls") across the display panel(s) during the presentation of an image for a given frame.

The HMD system, including the HMD, may also utilize a technique called "re-projection" to compensate for slight inaccuracies in an original pose prediction of the HMD and/or to compensate for the application failing to make frame rate, which has the same effect as an original pose prediction that is slightly inaccurate. For example, a re-projected frame can be generated using pixel data from an application-rendered frame by transforming (e.g., through rotation and re-projection calculations) the application-rendered frame in a way that accounts for an updated prediction of the pose of the HMD.

Described herein are techniques and systems for mitigating unwanted visual artifacts caused by re-projection in a region of interest on the display(s) where a user is looking, thereby improving the display performance by making these unwanted visual artifacts, if present, unnoticeable to the viewing user because they will not manifest in the region of interest. In an example process, before providing pose data as input to an application for rendering the next frame, logic of the HMD system (e.g., a compositor) may predict a location on the display panel where a user (who is wearing the HMD) will be looking during the illumination time period for the frame. This prediction may be based at least in part on eye tracking data generated by an eye tracking system of the HMD system. In some embodiments, the logic of the HMD system is configured to predict a gaze point where the user will be looking during the illumination time period based on the eye tracking data, and to determine a location on the display panel that corresponds to the predicted gaze point. The logic of the HMD system is also configured to determine a time, within the illumination time period, at which an individual subset of the pixels—that corresponds to the predicted location on the display panel—will be illuminated. Using head tracking data generated by a head tracking system of the HMD system, the logic can then predict a pose that the HMD will be in at the determined time (which was dynamically targeted based on the eye tracking data indicating where the user will be looking during the illumination time period). Pose data indicative of the predicted pose of the HMD can then be sent to the application for rendering a frame, and logic of the HMD system, upon receiving the frame from the application, can apply re-projection adjustments to the pixel data for the application-rendered frame to obtain modified pixel data associated with a re-projected frame. This modified pixel data can be output to a frame buffer for presenting an image on the display panel(s), whereby the individual subsets of the pixels are illuminated in sequence over the illumination time period to present the image.

By dynamically targeting the render time for an application-rendered frame based on eye tracking and the implied scan out latency for individual subsets of pixels, the scene (or picture) can be rendered for a time at which light (photons) from the region of interest on the display panel(s) will actually reach the user's eye. This means that the scene can be rendered correctly in the region of interest, and, hence, merely small-scale re-projection adjustments, if any, are applied to the pixel data (values) in the region of interest where the user is looking during image presentation. In other words, if, by tracking the user's eyes, it can be determined that the user is likely to look at subset of the pixels within the top portion of the display panel(s) during the rolling illumination time period, logic (e.g., the compositor) of the HMD system can tell the application to render the scene in accordance with the user's head pose that is predicted for the time when that subset of the pixels will illuminate during the rolling illumination time period. If, for a subsequent frame, the user is predicted to look at a subset of the pixels within the bottom portion of the display panel(s) during the rolling illumination time period, the logic can tell the application to render the scene in accordance with the user's head pose that is predicted for the time when that subset of the pixels will illuminate during the rolling illumination time period. Thus, instead of always rendering the given frame for a time when the middle row of pixels will illuminate, the techniques described herein are directed to dynamically selecting a render time for the next frame based on where on the display panel(s) the user is predicted to look during image presentation. Said another way, for each frame, the logic of the HMD system is configured to tell the application which point in time to choose for the "picture of the world" that is to be presented on the display panel(s), and this point in time is chosen based on a prediction of where the user will be looking when that picture of the world is presented.

Also disclosed herein are systems, for example, systems including a display system (e.g., a HMD system), configured to implement the techniques and processes disclosed herein, as well as non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like.

FIG. 1 is a diagram illustrating an example technique for dynamically targeting a render time for a given frame based on eye tracking. FIG. 1 depicts a head-mounted display (HMD) 100 worn by a user 102. The HMD 100 in the example of FIG. 1 may include a single display panel 104 or multiple display panels 104, such as a left display panel and a right display panel of a stereo pair of display panels. The one or more display panels 104 of the HMD 100 may be used to present a series of image frames (herein referred to as "frames") that are viewable by a user 102 wearing the HMD 100. It is to be appreciated that the HMD 100 may include any number of display panels 104 (e.g., more than two display panels, a pair of display panels, or a single display panel). Hence, the terms "display panel," as used in the singular herein, may refer to either display panel 104 of a pair of display panels of a two-panel HMD 100, or it may refer to a single display panel 104 of a HMD 100 with any number of display panels (e.g., a single-panel HMD 100 or a multi-panel HMD 100). In a two-panel HMD 100, a stereo frame buffer may render, for instance, 2160×1200 pixels on both display panels of the HMD 100 (e.g., 1080×1200 pixels per display panel).

The display panel(s) 104 of the HMD 100 may utilize any suitable type of display technology, such as an emissive display that utilizes light emitting elements (e.g., light emitting diodes (LEDs)) to emit light during presentation of frames on the display panel(s) 104. As an example, display panels 104 of the HMD 100 may comprise liquid crystal displays (LCDs), organic light emitting diode (OLED) displays, inorganic light emitting diode (ILED) displays, or any other suitable type of display technology for HMD applications.

The display panel(s) 104 of the HMD 100 may operate at any suitable refresh rate, such as a 90 Hertz (Hz) refresh rate. The "refresh rate" of a display is the number of times per second the display can redraw the screen. The number of frames displayed per second may be limited by the refresh rate of the display. Thus, a series of frames may be processed (e.g., rendered) and displayed as images on the display such that a single frame of the series of frames is displayed with every screen refresh. That is, in order to present a series of images on the display panel(s) 104, the display panel(s) 104 may transition from frame-to-frame, in the series of frames, at the refresh rate of the display, illuminating the pixels at every screen refresh. In some embodiments, the frame rate can be throttled, and phantom frames (based on re-projection) can be inserted between application-rendered frames.

The display system of the HMD 100 may also implement a rolling band type of display driving scheme. That is, the light emitting elements of the display panel(s) 104 may be individually-addressable such that individual subsets of the light emitting elements, and, hence, individual subsets of the pixels, can be illuminated independently and sequentially in a rolling band of illumination during an illumination time period. In some embodiments, both the array of pixels and the light emitting elements on the display panel(s) 104 are arranged in rows and columns, but not necessarily with a one-pixel per one-light emitting element correspondence. In this configuration, individual rows and/or individual columns of light emitting elements may be addressed in sequence, and/or individual groups of contiguous rows and/or individual groups of contiguous columns of light emitting elements may be addressed in sequence. As a consequence of addressing the light emitting elements in this "rolling" manner, the subsets of pixels that correspond to these individually-addressable subsets of light emitting elements may be "illuminated" independently.

As used herein, "illuminating a pixel" means illuminating the light emitting element that corresponds to that pixel. For example, a LCD illuminates a light emitting element of a backlight to illuminate the corresponding pixel(s) of the display. Furthermore, as used herein, a "subset of pixels" may comprise an individual pixel or multiple pixels (e.g., a group of pixels). In some embodiments, a subset of pixels includes a row of pixels, a column of pixels, a group of contiguous rows of pixels, or a group of contiguous columns of pixels. Thus, in an aspect of the techniques and systems described herein, subsets of pixels can be scanned out and illuminated in sequence (sequentially), such as by scanning out and illuminating each row of pixels in sequence, starting with a first row of the pixels (e.g., a top row of pixels) and ending with a last row of the pixels (e.g., a bottom row of pixels). However, any suitable pattern of illumination can be employed using the techniques and systems described herein (e.g., a snake-like pattern of illumination, column-by-column illumination, multiple rows/columns of pixels at a time in sequence, etc.).

In order to drive the display panel(s) 104 in this "rolling" manner, the HMD 100 may include, among other things, a display controller(s), display driver circuitry, and similar electronics for driving the display panel(s) 104. Display driver circuitry may be coupled to an array of light emitting elements of the display panel(s) 104 via conductive paths, such as metal traces, on a flexible printed circuit. In an example, a display controller(s) may be communicatively coupled to the display driver circuitry and configured to provide signals, information, and/or data to the display driver circuitry. The signals, information, and/or data received by the display driver circuitry may cause the display driver circuitry to illuminate the light emitting elements in a particular way. That is, the display controller(s) may determine which light emitting element(s) is/are to be illuminated, when the element(s) is/are to illuminate, and the level of light output that is to be emitted by the light emitting element(s), and may communicate the appropriate signals, information, and/or data to the display driver circuitry in order to accomplish that objective.

Pixel data for a given frame can be output to a frame buffer for presenting the frame as an image on the display panel 104. Pixel data for each frame may, in some embodiments, include a two-dimensional array of per-pixel values (e.g., color values). In some embodiments, the pixel data further includes additional data or metadata, such as depth values. In some embodiments, pixel data may include data for each pixel that is represented by a single set of color and alpha values (e.g., one color value for a red channel, one color value for a green channel, one color value for a blue channel, and one or more values for one or more alpha channels). This pixel data can be output to a frame buffer (e.g., a stereo frame buffer) to present on image(s) on the display panel(s) 104 of the HMD 100 with a desired visual effect.

The HMD 100 may represent a VR headset for use in VR systems, such as for use with a VR gaming system. However, the HMD 100 may additionally, or alternatively, be implemented as an AR headset for use in AR applications. In AR, a user 102 sees virtual objects overlaid on a real-world environment, whereas, in VR, the user 102 does not see a real-world environment, but is fully immersed in a virtual environment, as perceived via the display panel(s) 104 and the optics (e.g., lenses) of the HMD 100. Examples described herein pertain primarily to a VR-based HMD 100, but it is to be appreciated that the HMD 100 is not limited to implementation in VR applications.

In general, a graphics-based application 106 (e.g., a video game) executing on a computing device—such as the HMD 100 itself, or a computing device (e.g., a personal computer (PC), game console, etc.) associated with, and coupled to, the HMD 100 as part of a HMD system—may be configured to output a series of frames 108(1), 108(2), 108(3), and so on (collectively 108). The series of frames 108 are ultimately presented as images on the display panel(s) 104 of the HMD 100. The example of FIG. 1 depicts three example frames 108(1) (or frame "F"), 108(2) (or frame "F+1"), and 108(3) (or frame "F+2") with respect to a rendering timeline 110 to illustrate how the frames 108 can be rendered in series. Here, the application 106 renders frame F first, then frame F+1, and then frame F+2, in sequence, from left to right on the rendering timeline 110. The rendering timeline 110 also shows the rendering workloads 112 of a compositor 114 of the HMD 100 (or HMD system) towards the end of each rendering interval for each frame 108. An individual rendering workload 112 of the compositor 114 for a given frame 108 may represent adjustments that are applied to the pixel data output by the application 106 before rendering a final image on the HMD 100. Such adjustments may include, without limitation, adjustments for chromatic distortion, panel masking, re-projection, and the like, which are applied to the frame 108 output by the application 106 before rendering a final image on the HMD 100. Accordingly, the frames 108 that are shown in FIG. 1 are meant to represent "actual" frames in the sense that they are output from the application 106, which may represent a video game application, or any other type of graphics-based application. The application 106 may be executed in a graphics pipeline that outputs pixel data, and the compositor 114 is configured to modify that pixel data, and to output the modified pixel data to a frame buffer (e.g., a stereo frame buffer).

During runtime, an eye tracking system of the HMD 100 (or HMD system) may generate eye tracking data about a gaze point where the user 102 is looking at any given moment in time. The eye tracking system may include a camera or other optical sensor inside the HMD 100 to capture image data of a user's eyes 116, and the captured image data can be used to determine motion vectors, inter-pupillary distance, interocular distance, a three-dimensional (3D) position of each eye 116 relative to HMD 100, including a magnitude of torsion and rotation (e.g., roll, pitch, and yaw) and gaze directions for each eye 116. In one example, infrared light is emitted within the HMD 100 and reflected from each eye 116. The reflected light is received or detected by a camera of the HMD 100 and analyzed to extract eye rotation from changes in the infrared light reflected by each eye 116. In some embodiments, the eye tracking system may integrate information from past measurements, measurements identifying a position of a user's 102 head, and 3D information describing a scene presented on the display panel(s) 104. Thus, information for the position and orientation of the user's 102 eyes 116 can be used to determine the gaze point in a virtual scene presented by HMD 100 where the user 102 is looking. Many methods for tracking the eyes 116 of the user 102 can be employed by the eye tracking system of the HMD 100 (or HMD system), and these are merely examples of eye tracking techniques that can be employed.

In any case, the eye tracking data generated by the eye tracking system of the HMD 100 (or HMD system) can be used by the compositor 114 to predict a gaze point where the user 102 will be looking during an illumination time period for the upcoming frame 108, and this gaze point can be correlated to a location on the display panel(s) 104, which can be defined at any suitable level of granularity (e.g., an individual subset (e.g., row) of the pixels, an individual group of contiguous subsets (e.g., rows) of the pixels, other regions of the display panel(s) 104, etc.). In some embodiments, the most recent eye tracking data (e.g., the gaze point) can be used as a proxy for predicting where the user 102 will be looking during the illumination time period for an upcoming frame 108. With today's eye tracking technology, it is difficult to accurately predict where the user's eyes will be at a future time because of the ballistic motions that can be exhibited by the eyes during rapid eye movement. This is one reason for using the most recent gaze point estimation as a proxy for predicting a future gaze point. However, as eye tracking improves over time, the prediction of where the user 102 will be looking at a future time may become more accurate, and, hence, a prediction of a future gaze point may be determined as a function of past eye tracking data. For instance, a future gaze point can be predicted based on motion vector estimations of the user's eyes 116, and/or based on additional data.

FIG. 1 also shows a "scan out+illumination" timeline 118 to illustrate the illumination time periods corresponding to each frame 108 that is rendered in the rendering timeline 110. For example, after frame F is rendered by the application 106, and after the compositor 114 performs its rendering workload 112(1) to modify the pixel data for frame F, an image corresponding to frame F is presented on the display panel(s) 104 during the illumination time period 120(1) for frame F. During this illumination time period 120(1), subsets of pixel values (pixel data) for frame F are scanned out to the display panel(s) 104 via a display port (e.g., a high-definition multimedia interface (HDMI)), in sequence, and the light emitting elements of the display panel(s) 104 are illuminated in sequence to cause individual subsets of the pixels to illuminate in sequence. FIG. 1 illustrates an example where the individual subsets of pixels correspond to individual rows of pixels. For example, the display panel(s) 104 may have multiple rows of pixels, starting with a first row ("Row 1"), which may be the top row, and ending with a last row ("Row N"), which may be the bottom row. The illumination time period 120 may also be described in terms of the times $t_1$ to $t_N$ shown in FIG. 1. For example, the first subset of pixels (e.g., "Row 1") may illuminate at time, $t_1$, and the last subset of pixels (e.g., "Row N") may illuminate at time, $t_N$, while the intermediate subsets of pixels may illuminate at respective times between these outer bounds of the illumination time period 120. As mentioned, for a 90 Hz refresh rate, the illumination time period 120 may be roughly 11 ms in duration.

In the example of FIG. 1, in order to render frame F, the compositor 114 may predict the gaze point where the user 102 will be looking during the illumination time period 120(1) for frame F. In the example of FIG. 1, the predicted gaze point for frame F is a gaze point that corresponds to an individual subset (or a group of contiguous subsets) of the pixels within a top portion of the display panel(s) 104. This may be described as the compositor 114 predicting a location of the display panel(s) 104 where the user 102 will be looking during the illumination time period 120(1), and, in this case, the predicted location for frame F is a location that corresponds to an individual subset (or a group of contiguous subsets) of the pixels within the top portion of the display panel(s) 104. It is to be appreciated that a "location" of the display panel(s) 104 can be defined in any suitable manner and/or at any suitable level of granularity suitable for describing where, on the display panel(s) 104 the user 102 may be looking. The example of FIG. 1 illustrates an example where the location of the display panel(s) 104 can be determined based on the rows of pixels of the display panel(s). Depending on the accuracy of the eye tracking system of the HMD 100 (or HMD system), and the resolution at which the individual subsets of pixels can be addressed, the prediction of where the user 102 will be looking can be made at any suitable level of granularity, such as by estimating that the user 102 is looking at a given subset(s) of pixels (e.g., an individual row(s) of pixels, an individual column(s) of pixels, etc.), or individual groups of contiguous subsets (e.g., groups of contiguous rows, groups of contiguous columns, etc.) of pixels.

Once the compositor 114 determines where the user 102 will be looking when the image corresponding to frame F is presented, the compositor 114 may be further configured to determine a time, within the illumination time period 120(1) for frame F, at which an individual subset of the pixels that corresponds to the location on the display panel(s) 104 (where the user 102 is predicted to be looking) will be illuminated. For example, if the user 102 is predicted to be looking at an individual subset (or a group of contiguous subsets) of the pixels within the top portion of the display panel(s) 104 during the illumination time period 120(1) for frame F, the compositor 114 may determine a time at which that subset of the pixels (within the top portion of the display panel(s) 104) will be illuminated. In an example, the compositor 114 may determine that the first row of pixels (e.g., "Row 1")—which is within the top portion of the display panel(s) 104—will illuminate at time $t_1$. In this example, the compositor 114 may determine a target render time (within the illumination time period 120(1) for frame F) as target render time=$t_1$, because the user 102 is predicted to be looking at a location corresponding to the first row of pixels within the top portion of the display panel(s) 104 during the illumination time period 120(1) for frame F, based on the eye tracking data. As another example, if the user 102 is predicted to look at the $200^{th}$ row of pixels, for example, the compositor 114 may determine, as the target render time, an illumination time of the $200^{th}$ row of pixels.

In addition to the eye tracking system, a head tracking system of the HMD 100 (or HMD system) may generate head tracking data about the pose of the HMD 100, and the compositor 114 is configured to predict a pose that the HMD 100 will be in at the determined time (the targeted render time). Thus, for frame F, the compositor 114 may predict a pose that the HMD 100 will be in at the time, $t_1$, which was determined to be the time when the subset of pixels (e.g., "Row 1") within the top portion of the display panel(s) 104 will be illuminated during the illumination time period 120(1). The compositor 114 may send pose data indicative of the predicted pose to the application 106 for rendering frame F. Providing the pose data to the application 106 in advance allows the application 106 to output pixel data for rendering imagery on the HMD 100 in a way that is correct for the user's 102 predicted head pose at the future, targeted render time, $t_1$. This means that the application 106 renders a scene that is appropriate for the user's predicted head pose at time, $t_1$, when light from the portion of the display panel(s) 104 where the user 102 is predicted to be looking reaches the user's eye(s) 116.

The graphics logic of the HMD 100 (or HMD system) may be asynchronous, or synchronous. In an asynchronous system, the compositor 114 runs separate (on a separate, asynchronous thread) from the application 106 on a graphics processing unit (GPU) of the HMD 100 (or HMD system). For instance, the application 106 may call a function to receive pose data from the compositor 114, and the compositor 114 may provide the application 106 with the requested pose data (predicted to the target render time, $t_1$, for frame F) so that the application 106 can render the frame 108 (e.g., frame F) according to the pose data, which corresponds to a virtual camera pose used to render the scene. Assuming the application 106 finishes rendering the frame 108 before the compositor's workload 112 starts, the compositor 114 is configured to take the frame 108 (e.g., left and right image frames) from the application 106 and distort the frame(s) 108 into the back buffer(s) onto the display panel(s) 104 of the HMD 100. For example, the compositor 114 may perform, without limitation, chromatic distortion, panel masking, re-projection, and the like, before rendering a final image on the HMD 100 based on the frame 108 output by the application 106.

The compositor 114 may execute in a high-priority context mode, which means that when it is time for the compositor 114 to start its workload 112, the GPU driver allows the compositor 114 to preempt the application 106 (e.g., by interrupting the application 106 from rendering, if it is still rendering a frame 108, and/or preventing the application 106 from starting to render a next frame 108).

The compositor 114 may allocate a time slot (up to 1 ms on average) at the end of each rendering interval to do its work 112, regardless of what is happening with the application 106. Thus, at every rendering interval, the compositor 114 renders "something" in the sense that the compositor 114 obtains the best frame 108 it can obtain from the application 106 (e.g., either a fresh/new frame 108, or a previously-rendered frame 108), and the compositor 114 uses the pixel data associated with that frame 108 to put pixel data in the frame buffer for output on the display panel(s) 104 of the HMD 100. The compositor's 114 ability to output different pixel data for each screen refresh, no matter what, is the mechanism that keeps everything "live" and keeps the images rendered on the HMD 100 from hitching badly when the application 106 is not making frame rate.

By dynamically targeting the render time as a time (e.g., $t_1$ for frame F) at which a subset of pixels nearest to where the user will be looking will illuminate, the image corresponding to frame F can be presented during the illumination time period 120 with merely small-scale re-projection adjustments, if any, at a location on the display panel 104 where the user 102 is looking during the illumination time period 120. This means that the user 102 will not see unwanted visual artifacts caused by re-projection with respect to moving or animating objects in the region of interest where the user is looking during the presentation of the image.

After frame F is rendered, the dynamic render time targeting may iterate for each frame in the series of frames 108, as they are rendered. For example, for frame F+1, the eye tracking data may indicate that the user 102 will be looking at an individual subset (or a group of contiguous subsets) of the pixels within the middle portion of the display panel(s) 104 during the illumination time period 120(2) for frame F+1, which causes the compositor 114 to dynamically target, as the render time for frame F+1, a time at which that subset (or group of subsets) of pixels in the middle portion of the display panel(s) 104 will illuminate. For example, the compositor 114 may determine that the middle row of pixels will illuminate at time, $$\frac{t_N}{2},$$

and, thus, may predict a pose that the HMD 100 will be in at time, $$\frac{t_N}{2}.$$

the compositor 114 may send pose data indicative of this predicted pose to the application 106 for rendering frame F+1, and, in response, the compositor 114 may receive pixel data for frame F+1. During the compositor's 114 rendering workload 112(2) for frame F+1, the compositor 114 may apply re-projection adjustments to the pixel data for frame F+1, among other adjustments that are applied during the rendering workload 112(2), to obtain modified pixel data associated with a re-projected frame for frame F+1, and the compositor 114 may output the modified pixel data to a frame buffer so that a corresponding image can be presented on the display panel(s) 104 during the illumination time period 120(2) for frame F+1.

Likewise, for frame F+2, the eye tracking data may indicate that the user 102 will be looking at an individual subset (or a group of contiguous subsets) of the pixels within the bottom portion of the display panel(s) 104 during the illumination time period 120(3) for frame F+2, which causes the compositor 114 to dynamically target, as the render time for frame F+2, a time at which that subset (or group of subsets) of pixels in the bottom portion of the display panel(s) 104 will illuminate. For example, the compositor 114 may determine that the $N^{th}$ row of pixels will illuminate at time, $t_N$, and, thus, may predict a pose that the HMD 100 will be in at time, $t_N$. The compositor 114 may send pose data indicative of this predicted pose to the application 106 for rendering frame F+2, and, in response, the compositor 114 may receive pixel data from the application 106 for frame F+2. During the compositor's 114 rendering workload 112 (3) for frame F+2, the compositor 114 may apply re-projection adjustments to the pixel data for frame F+2, among other adjustments, to obtain modified pixel data associated with a re-projected frame for frame F+2, and the compositor 114 may output the modified pixel data to a frame buffer so that a corresponding image can be presented on the display panel(s) 104 during the illumination time period 120(3) for frame F+2.

In some embodiments, logic of the HMD 100 (or HMD system) may be configured to address different locations of the display panel(s) 104 at different resolutions. In this manner, since the eye tracking data can be used to predict a region of interest on the display panel(s) 104 where the user 102 will be looking during image presentation, the HMD 100 (or HMD system) can leverage this dynamic addressing mechanism to dynamically address the location of the display panel(s) 104 where the user 102 is looking at a first (high) resolution, and to dynamically address a remainder of the display panel(s) 104 at a second (lower) resolution that is less than the first resolution. This may provide improved display quality in the region of interest, as well as improved display performance in terms of reducing latency for scanning out pixel data because the area outside of the region of interest may have less pixel data to scan out.

Figure 2:
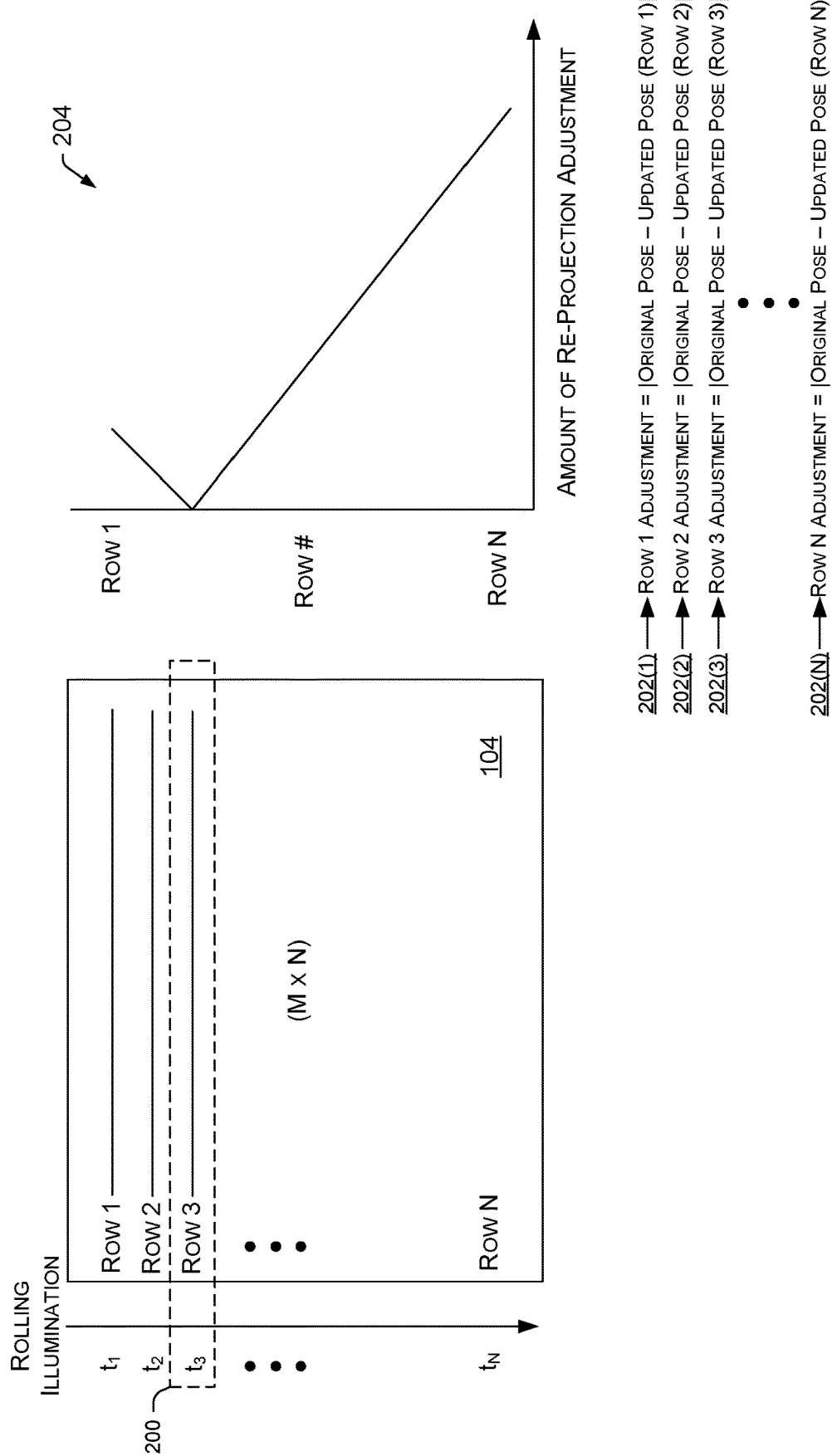
FIG. 2 is a diagram illustrating how the degree of re-projection adjustments varies across the display for different subsets of pixels when using an approach to dynamically target the render time for a given frame based on eye tracking, in accordance with embodiments disclosed herein.

FIG. 2 is a diagram illustrating how the degree of re-projection adjustments varies across the display for different subsets of pixels when using an approach to dynamically target the render time for a given frame 108 based on eye tracking, in accordance with embodiments disclosed herein. FIG. 2 shows a display panel 104 of the HMD 100, both of which were introduced in FIG. 1. In some embodiments, this display panel 104 may represent a left display panel or a right display panel of a stereo pair of display panels of the HMD 100. The display panel 104 is shown as including a M×N array of pixels. In this case, the pixels are arranged in M columns and N rows, where M is any suitable number, N is any suitable number, and M and N may or may not be equal. As described herein, because the display panel 104 is driven using a rolling band display driving technique, the rolling illumination during the presentation of an image for a given frame 108 occurs by illuminating individual subsets of pixels in sequence over the illumination time period 120, which was introduced in FIG. 1. In the example of FIG. 2, the individual subsets of pixels correspond to individual rows of pixels (e.g., Rows 1-N), and the rows are illuminated in sequence from a first row ("Row 1") to a last row ("Row N") over the illumination time period 120 for a given frame 108. In the illustrated example, this means that the rolling illumination occurs from top-to-bottom, but it is to be appreciated that this is merely an example sequence in which subsets of pixels can be illuminated.

Consider an example where the targeted render time 200 is predicted to be the time, $t_3$, within the illumination time period 120, which may be describes as a time period from time, $t_1$, to time, $t_N$. This example targeted render time 200 may be determined, for example, if the eye tracking data indicates that the user 102 will be looking at an individual subset (or a group of contiguous subsets) of the pixels within a top portion of the display panel 104 during the illumination time period 120 for the given frame; e.g., the third row of pixels ("Row 3"). Accordingly, the compositor 114 is configured to predict a pose that the HMD 100 will be in at the targeted render time 200 (e.g., time, $t_3$), and the compositor 114 can send pose data indicative of this predicted pose to the application 106 for rendering the given frame 108. After receiving pixel data for the application-rendered frame 108, the compositor 114, during its rendering workload 112 for the given frame 108, can apply re-projection adjustments to the pixel data.

To determine the re-projection adjustments that are to be applied to the received pixel data, the compositor 114, after receiving the pixel data, can predict—based at least in part on updated head tracking data generated by the head tracking system of the HMD 100 (or HMD system)—a plurality of updated poses of the HMD 100 for a plurality of times, within the illumination time period 120, at which the individual subsets of the pixels will be illuminated. For example, upon receiving, from the application 106, the pixel data associated with the given frame 108, the compositor 114 can predict a first updated pose that the HMD 100 will be in at time, $t_1$, for the first row of pixels ("Row 1"), a second updated pose that the HMD 100 will be in at time, $t_2$, for the second row of pixels ("Row 2"), a third updated pose that the HMD 100 will be in at time, $t_3$, for the third row of pixels ("Row 3"), . . . , and an $N^{th}$ updated pose that the HMD 100 will be in at time, $t_N$, for the $N^{th}$ row of pixels ("Row N"). With the plurality of updated pose predictions in hand, the compositor 114 can calculate (or otherwise determine) a plurality of adjustments 202(1)-(N) based at least in part on comparisons between the original pose prediction and individual ones of the updated poses. For example, the plurality of adjustments 202(1)-(N) may include a first adjustment 202(1) for a first individual subset of the pixels (e.g., the first row of pixels, "Row 1"), a second adjustment 202(2) for a second individual subset of the pixels (e.g., the second row of pixels, "Row 2"), a third adjustment 202(3) for a third individual subset of the pixels (e.g., the third row of pixels, "Row 3"), . . . , and an $N^{th}$ adjustment 202(N) for an $N^{th}$ individual subset of the pixels (e.g., the $N^{th}$ row of pixels, "Row N"). In the example of FIG. 2, an individual adjustment (e.g., the first adjustment 202(1)) may be calculated (or otherwise determined) as a difference calculation based on the original pose prediction that was provided as input to the application 106 and the updated pose prediction for the corresponding pixel subset (e.g., the updated pose prediction for the time, $t_1$, when the first row of pixels ("Row 1") is going to illuminate).

The graph 204 shown in FIG. 2 illustrates how the re-projection adjustments are small-scale adjustments for the subsets of pixels near the location of the display panel 104 where the user 102 is looking. In the example of FIG. 2, these pixels correspond to the pixels near the third row of pixels ("Row 3"). For instance, there may be little-to-no re-projection adjustments made to the pixel values for the third row of pixels ("Row 3"), and merely small-scale re-projection adjustments for pixel values of adjacent rows of pixels. This is because, in the example of FIG. 2, the original pose prediction was made for the target render time, $t_3$, which is a time when the third row of pixels ("Row 3") will illuminate during the illumination time period 120 (i.e., during image presentation), and the updated pose prediction for the same time, $t_3$, associated with the third row of pixels ("Row 3") is likely to be the same as the original pose prediction, or, if different, the difference is expected to be smaller than the differences between the original pose prediction and others of the updated pose predictions. Accordingly, the re-projection adjustments applied to the pixel values for the third row of pixels ("Row 3") are small-scale re-projection adjustments, if any are applied at all. The re-projection adjustments gradually increase in amount for rows that are farther from the third row of pixels ("Row 3"). Thus, any re-projection adjustments for individual subsets (rows) of pixels that are adjacent to the third row of pixels ("Row 3") will be less than the re-projection adjustments for those subsets (rows) of pixels that are far from (i.e., not adjacent to) the third row of pixels ("Row 3"). This is why the re-projection adjustment applied to the pixel values for the $N^{th}$ row of pixels ("Row N") is much larger than the re-projection adjustment applied to the pixel values for, say, the second row of pixels ("Row 2"). However, because the user 102 is looking at an individual subset (or a group of contiguous subsets) of the pixels within the top portion of the display panel 104 (e.g., the third row of pixels ("Row 3")) during image presentation, any unwanted visual artifacts caused by re-projection adjustments at the bottom of the display panel 104 go unnoticed. Meanwhile, the region of interest where the user 102 is looking will be free from these types of unwanted visual artifacts caused by re-projection.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
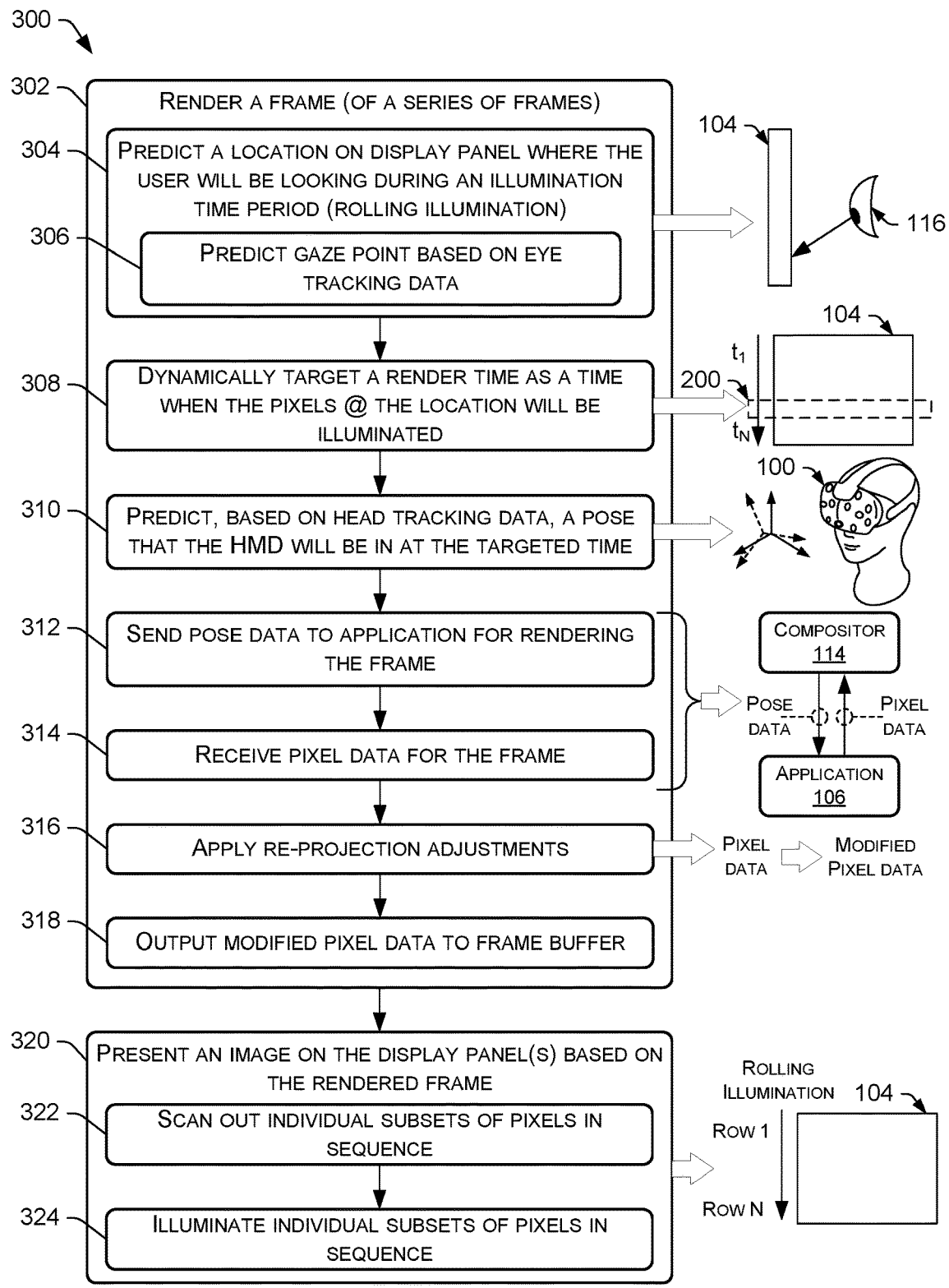
FIG. 3 illustrates a flow diagram of an example process for dynamically targeting a render time for a given frame based on eye tracking, in accordance with embodiments disclosed herein.

FIG. 3 illustrates a flow diagram of an example process 300 for dynamically targeting a render time for a given frame based on eye tracking, in accordance with embodiments disclosed herein. For discussion purposes, the process 300 is described with reference to the previous figures.

At 302, a frame 108, of a series of frames, may be rendered for presenting a corresponding image on a display panel 104 of a HMD 100. As mentioned, if the HMD 100 includes a pair of display panels, this frame 108 may be rendered for presenting a first image on the left display panel 104 and a second image on the right display panel 104, or vice versa. As shown by the various sub-blocks within 302, there may be various sub-operations that are performed by the logic of the HMD 100 (or HMD system) for purposes of rendering the frame 108 at block 302.

At sub-block 304, logic of a HMD 100 (or HMD system) (e.g., logic including the compositor 114) may predict a location on the display panel 104 where a user 102 wearing the HMD 100 will be looking during an illumination time period 120 for the frame 108. Here, the illumination time period 120 is a duration over which individual subsets of the pixels on the display panel 104 are illuminated in sequence to present an image on the display panel 104. As shown by sub-block 306, the prediction of the location on the display panel 104 where the user 102 will be looking may be based at least in part on eye tracking data generated by the eye tracking system of the HMD 100 (or HMD system). For instance, at sub-block 306, the logic (e.g., compositor 114) may predict, based at least in part on eye tracking data generated by the eye tracking system, a gaze point where the user 102 will be looking during the illumination time period 120 for the frame 108, and this gaze point may correspond to a particular location on the display panel 104. As such, the logic (e.g., compositor 114) may be configured to determine a location on the display panel 104 that corresponds to the predicted gaze point (e.g., by accessing association data between possible gaze points and various locations on the display panel 104, and/or calculating the location based on the eye tracking data and other parameters). In an illustrative example, the eye tracking data (e.g., eye orientation data) may indicate an eye orientation of the user wearing the HMD 100, such as in the form of a number of degrees from a midline of a field of view (FOV) parameter of the HMD 100. For example, based on a FOV parameter (e.g., 110 degree) of the HMD 100, and possibly based on distortion parameters of the HMD optics), the eye orientation data may be used to estimate a subset (e.g., a row) or a group of contiguous subsets (e.g., a group of contiguous rows) of pixels that are closest or nearest to where the user will be looking during the illumination time period of the upcoming frame. For instance, if the eye orientation data indicates that the user will be looking +20 degrees from a midline of a 110 degree FOV, this may be calculated degree offset may be correlated, through mathematical calculation, to a row (or group of contiguous rows) of the display panel 104 (e.g., the $400^{th}$ row on a 1200 row display panel). Thus, the prediction of the location of the display panel 104 where the user will be looking may be based on the FOV parameter of the HMD 100, in combination with the eye tracking data.

At sub-block 308, the logic (e.g., compositor 114) may dynamically target a render time 200 for the frame 108 based on the prediction of where, on the display panel 104, the user 102 will be looking. That is, the logic may determine a time, within the illumination time period 120 for the frame 108, at which an individual subset of the pixels that corresponds to (e.g., are within) the location on the display panel 104 will be illuminated. In the pictorial diagrams on the right of FIG. 3, an example is shown where the logic predicts, at sub-block 304, that the user 102 will be looking at a bottom portion of the display panel 104, and, at sub-block 308, the logic determines a targeted render time 200 within the illumination time period 120 (e.g., from time, $t_1$, to time, $t_N$) that corresponds to a time when a subset (e.g., row) of pixels in the bottom portion of the display panel 104 will illuminate.

At sub-block 310, the logic (e.g., compositor 114) may predict a pose that the HMD 100 will be in at the time that was determined at sub-block 308 (i.e., the targeted render time 200). The original prediction of the pose of the HMD 100 at sub-block 310 may be based at least in part on head tracking data generated by the head tracking system of the HMD 100 (or HMD system).

At sub-block 312, the logic (e.g., compositor 114) may send, to an application 106 for purposes of rendering the frame 108, pose data indicative of the pose predicted at sub-block 310.

At sub-block 314, the logic (e.g., compositor 114) may receive, from the application 106, pixel data for the frame 108. The pixel data may include pixel values, as described herein, for individual pixels in the array of pixels of the display panel 104.

At sub-block 316, the logic (e.g., compositor 114) may apply re-projection adjustments to the pixel data for the frame 108 to obtain modified pixel data associated with a re-projected frame. In the diagram of FIG. 1, this may occur during the compositor's 114 rendering workload 112 after receiving the pixel data for the frame 108 from the application 106.

At sub-block 318, the logic (e.g., compositor 114) may output the modified pixel data to a frame buffer(s). Again, for a HMD 100 with a pair of display panels 104, this pixel data may correspond to a frame that represents a pair of images to be displayed on the pair of display panels 104.

At 320, logic of the HMD 100 (or HMD system) (e.g., a display controller, display driver circuitry, etc.) may cause an image to be presented on the display panel 104 based on the frame 108 that was rendered at block 302 (e.g., based at least in part on the modified pixel data output to the frame buffer at sub-block 318). As shown by the sub-blocks 322 and 324, the presentation of the image at block 320 may include one or more sub-operations.

At sub-block 322, for example, the modified pixel data may be scanned out in sequence for individual subsets of pixels on the display panel 104. For example, the pixel values for individual rows of pixels may be sequentially scanned out to the display panel(s) 104 via a display port (e.g., a HDMI), starting with a first subset (e.g., row) of pixels and ending with a last subset (e.g., row) of pixels.

At sub-block 324, the individual subsets of pixels may be illuminated in the sequence over the illumination time period 120 for the frame 108 in order to present an image on the display panel(s) 104. This may be accomplished by driving the light emitting elements of the display panel(s) 104 using a rolling band display driving technique, where individual subsets of light emitting elements of the display panel(s) 104 are illuminated in sequence to cause corresponding subsets of pixels to illuminate in sequence during image presentation.

Figure 4:
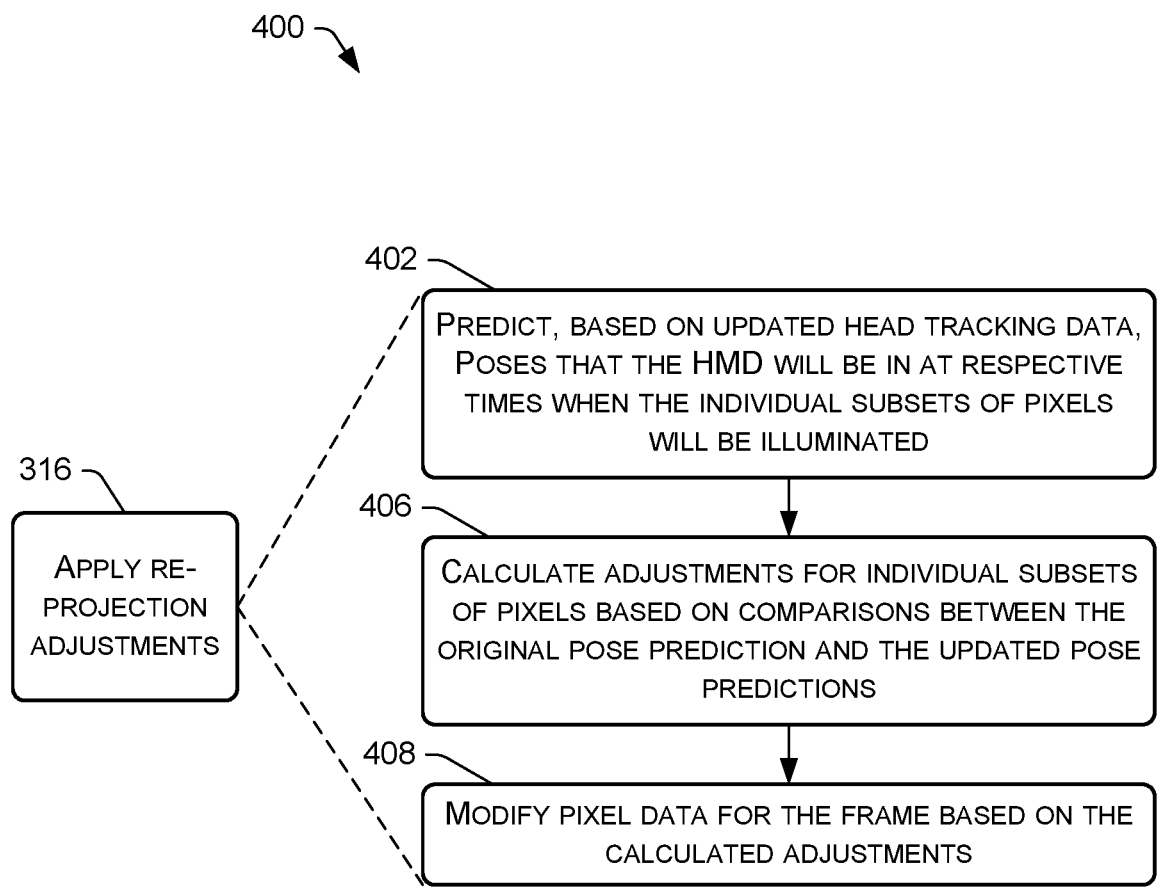
FIG. 4 illustrates a flow diagram of an example sub-process for applying re-projection adjustments, in accordance with embodiments disclosed herein.

FIG. 4 illustrates a flow diagram of an example sub-process 400 for applying re-projection adjustments (e.g., a sub-process of block 316 of the process 300), in accordance with embodiments disclosed herein. For discussion purposes, the process 400 is described with reference to the previous figures.

At 402—after the compositor 114 has received, from the application 106, pixel data for the frame 108—logic of the HMD 100 (or HMD system) (e.g., logic including the compositor 114) may predict, based at least in part on updated (second) head tracking data generated by the head tracking system of the HMD 100 (or HMD system), a plurality of updated poses of the HMD 100 for a plurality of times, within the illumination time period 120 for the frame 108, at which the individual subsets of the pixels will be illuminated. In the example where the individual subsets of the pixels are individual rows of pixels, the plurality of updated poses that are predicted at block 402 may include a first updated pose of the HMD 100 for a time at which the first row of pixels ("Row 1") will be illuminated, a second updated pose of the HMD 100 for a time at which the second row of pixels ("Row 2") will be illuminated, and so on, for N rows of pixels, N being any suitable number.

At 406, the logic (e.g., compositor 114) may calculate (or otherwise determine) a plurality of adjustments (e.g., re-projection adjustments) based at least in part on comparisons between the originally-predicted pose and individual ones of the updated poses. That is, individual ones of the updated poses predicted at block 402 may be compared to the original pose that was predicted at block 310 of the process 300, and which was sent to the application 106 as input for rendering the frame 108. The comparison between poses at block 406 may determine a transform that can be applied to the originally-predicted pose to obtain the individual updated pose in question. For example, one of the adjustments determined at block 406 may, for example, correspond to a transform that can be applied to the originally-predicted pose to obtain the updated pose of the HMD 100 for the first row of pixels. Additional transforms can be determined in a similar manner for other subsets of pixels.

At 408, the logic (e.g., compositor 114) may modify the pixel data for the frame 108 (which was received from the application 106), based at least in part on the plurality of adjustments calculated at block 406, to obtain the modified pixel data associated with the re-projected frame. Referring briefly again to FIG. 2, the graph 204 illustrates an example of how the adjustments calculated at block 406 can vary across the display panel(s) 104 due to the rolling band display driving technique that illuminates the individual subsets of pixels at different times, in sequence, and due to the fact that the user's 102 head may be constantly moving in space. The adjustments for subsets of pixels that are adjacent to the subset of pixels associated with the targeted render time 200 are small-scale adjustments, while other adjustments for subsets of pixels that are not adjacent to the subset of pixels associated with the targeted render time 200 are larger-scale adjustments; just how large these larger-scale adjustments are, as compared to the small-scale adjustments of adjacent pixel subsets, depends on the amount (or rate) of head rotation that is occurring while the frame 108 is rendered and a corresponding image is presented. In any case, a first adjustment, of the plurality of adjustments, for a first individual subset of the pixels that is adjacent to the subset of pixels associated with the targeted render time 200 is likely to be less than a second adjustment, of the plurality of adjustments, for a second individual subset of the pixels that is not adjacent to the subset of pixels associated with the target render time 200, as depicted in the graph 204 of FIG. 2. This means that the image presented on the display panel(s) 104 is free from unwanted artifacts (e.g., judder) caused by re-projection at the location on the display panel(s) 104 where the user 102 is looking.

Figure 5:
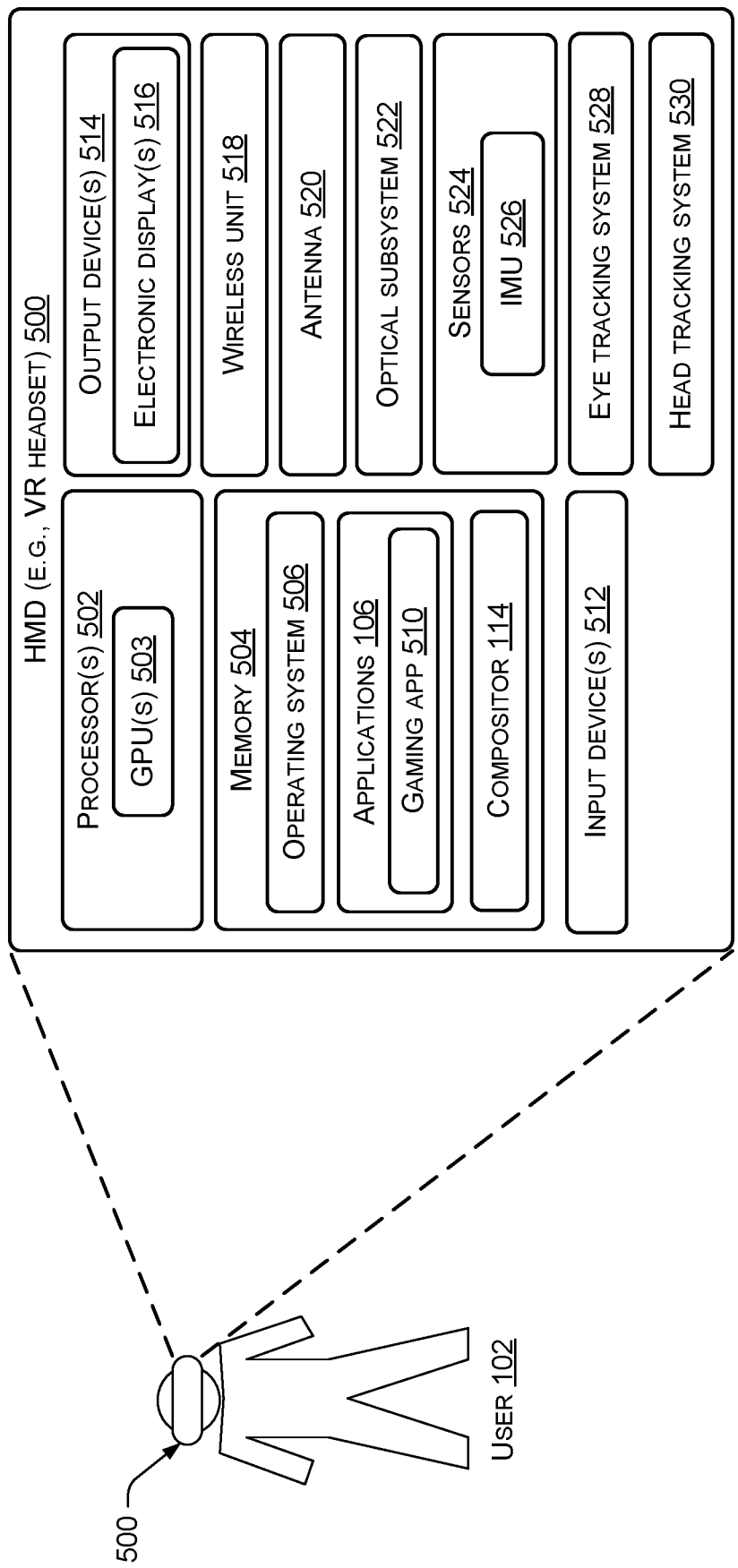
FIG. 5 illustrates example components of a wearable device, such as a VR headset, in which the techniques disclosed herein can be implemented.

FIG. 5 illustrates example components of a HMD 500 (or a HMD system that includes the HMD 500), such as a VR headset, according to the embodiments disclosed herein may be embedded. The HMD 500 may be the same as, or similar to, the HMD 100 referenced in the previous figures, and, therefore, the components of the HMD 500 shown in FIG. 5 may be implemented in the HMD 100. The HMD 500 may be implemented as a standalone device that is to be worn by a user 102 (e.g., on a head of the user 102). In some embodiments, the HMD 500 may be head-mountable, such as by allowing a user 102 to secure the HMD 500 on his/her head using a securing mechanism (e.g., an adjustable band) that is sized to fit around a head of a user 102. In some embodiments, the HMD 500 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 500 of FIG. 5. However, it is to be appreciated that these types of devices are merely example of a HMD 500, and it is to be appreciated that the HMD 500 may be implemented in a variety of other form factors. It is also to be appreciated that some or all of the components shown in FIG. 5 may be implemented on the HMD 500. Accordingly, in some embodiments, a subset of the components shown in FIG. 5 may be implemented on a computing device that is part of the HMD system, but is separate from the HMD 500 itself, such as a PC, a game console, or any other suitable computing device.

In the illustrated implementation, the HMD 500 includes one or more processors 502 and memory 504 (e.g., computer-readable media 504). In some implementations, the processors(s) 502 may include a central processing unit (CPU), a graphics processing unit (GPU)(s) 503, both CPU and GPU 503, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 502 may possess its own local memory, which also may store program modules, program data, and/or one or more operating systems.

The memory 504 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 504 may be implemented as computer-readable storage media ("CRSM"), which may be any available physical media accessible by the processor(s) 502 to execute instructions stored on the memory 502. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 502.

In general, the HMD 500 may include logic (e.g., software, hardware, and/or firmware, etc.) that is configured to implement the techniques, functionality, and/or operations described herein. The computer-readable media 504 is shown as including various modules, such as instruction, datastores, and so forth, which may be configured to execute on the processor(s) 502 for carrying out the techniques, functionality, and/or operations described herein. A few example functional modules are shown as stored in the computer-readable media 504 and executable on the processor(s) 502, although the same functionality may alternatively be implemented in hardware, firmware, or as a system on a chip (SOC), and/or other logic.

An operating system module 506 may be configured to manage hardware within and coupled to the HMD 500 for the benefit of other modules. In addition, in some instances the HMD 500 may include one or more applications 106 stored in the memory 504 or otherwise accessible to the HMD 500. In this implementation, the application(s) 106 includes a gaming application 510. However, the HMD 500 may include any number or type of applications and is not limited to the specific example shown here. The gaming application 510 may be configured to initiate gameplay of a video-based, interactive game (e.g., a VR game) that is playable by the user 102, and to output frames 108 to be rendered on the display panels of the HMD 500. A compositor 114, in combination with other logic of the HMD 500, may be configured to perform the techniques described herein to dynamically target a render time for an application (e.g., the application 106) based on eye tracking.

Generally, the HMD 500 has input devices 512 and output devices 514. The input devices 512 may include control buttons. In some implementations, one or more microphones may function as input devices 512 to receive audio input, such as user voice input. In some implementations, one or more cameras or other types of sensors (e.g., inertial measurement unit (IMU)) may function as input devices 512 to receive gestural input, such as a hand and/or head motion of the user 102. In some embodiments, additional input devices 512 may be provided in the form of a keyboard, keypad, mouse, touch screen, joystick, and the like. In other embodiments, the HMD 500 may omit a keyboard, keypad, or other similar forms of mechanical input. Instead, the HMD 500 may be implemented relatively simplistic forms of input device 512, a network interface (wireless or wire-based), power, and processing/memory capabilities. For example, a limited set of one or more input components may be employed (e.g., a dedicated button to initiate a configuration, power on/off, etc.) so that the HMD 500 can thereafter be used. In one implementation, the input device(s) 512 may include control mechanisms, such as basic volume control button(s) for increasing/decreasing volume, as well as power and reset buttons.

The output devices 514 may include a display(s) 516, which may include one or multiple display panels 104 (e.g., a stereo pair of display panels 104), as described herein. The output devices 514 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 500 may further include a wireless unit 518 coupled to an antenna 520 to facilitate a wireless connection to a network. The wireless unit 518 may implement one or more of various wireless technologies, such as Wi-Fi, Bluetooth, radio frequency (RF), and so on. It is to be appreciated that the HMD 500 may further include physical ports to facilitate a wired connection to a network, a connected peripheral device (including a PC, game console, etc.), or a plug-in network device that communicates with other wireless networks, and which may be part of the HMD system.

The HMD 500 may further include optical subsystem 522 that directs light from the electronic display(s) 516 to a user's eye(s) using one or more optical elements. The optical subsystem 522 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 522 may have one or more coatings, such as anti-reflective coatings. Magnification of the image light by optical subsystem 522 allows electronic display(s) 516 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 522 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display(s) 516 for display is pre-distorted, and optical subsystem 522 corrects the distortion when it receives image light from electronic display(s) 516 generated based on the content.

The HMD 500 may further include one or more sensors 524, such as sensors used to generate motion, position, and orientation data. These sensors 524 may be or include gyroscopes, accelerometers, magnetometers, video cameras, color sensors, or other motion, position, and orientation sensors. The sensors 524 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 500 may include light sensors that are sensitive to light (e.g., infrared or visible light) that is projected or broadcast by base stations in the environment of the HMD 500.

In an example, the sensor(s) 524 may include an inertial measurement unit (IMU) 526. IMU 526 may be an electronic device that generates calibration data based on measurement signals received from accelerometers, gyroscopes, magnetometers, and/or other sensors suitable for detecting motion, correcting error associated with IMU 526, or some combination thereof. Based on the measurement signals such motion-based sensors, such as the IMU 526, may generate calibration data indicating an estimated position of HMD 500 relative to an initial position of HMD 500. For example, multiple accelerometers may measure translational motion (forward/back, up/down, left/right) and multiple gyroscopes may measure rotational motion (e.g., pitch, yaw, and roll). IMU 526 can, for example, rapidly sample the measurement signals and calculate the estimated position of HMD 500 from the sampled data. For example, IMU 526 may integrate measurement signals received from the accelerometers over time to estimate a velocity vector and integrates the velocity vector over time to determine an estimated position of a reference point on HMD 500. The reference point is a point that may be used to describe the position of the HMD 500. While the reference point may generally be defined as a point in space, in various embodiments, reference point is defined as a point within HMD 500 (e.g., a center of the IMU 526). Alternatively, IMU 526 provides the sampled measurement signals to an external console (or other computing device), which determines the calibration data.

The sensors 524 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 524 may include light sensors that are sensitive to light emitted by base stations in the environment of the HMD 500 for purposes of tracking position and/or orientation, pose, etc., of the HMD 500 in 3D space. The calculation of position and/or orientation may be based on timing characteristics of light pulses and the presence or absence of light detected by the sensors 524.

The HMD 500 may further include an eye tracking system 528, as described elsewhere herein as the system that generates eye tracking data. The eye tracking system 528 may include, without limitation, a camera or other optical sensor inside HMD 500 to capture image data (or information) of a user's eyes 116, and the eye tracking system 528 may use the captured data/information to determine motion vectors, interpupillary distance, interocular distance, a three-dimensional (3D) position of each eye 116 relative to HMD 500, including a magnitude of torsion and rotation (i.e., roll, pitch, and yaw) and gaze directions for each eye 116. In one example, infrared light is emitted within HMD 500 and reflected from each eye 116. The reflected light is received or detected by a camera of the eye tracking system 528 and analyzed to extract eye rotation from changes in the infrared light reflected by each eye 116. Many methods for tracking the eyes 116 of a user 102 can be used by eye tracking system 528. Accordingly, eye tracking system 528 may track up to six degrees of freedom of each eye (i.e., 3D position, roll, pitch, and yaw) and at least a subset of the tracked quantities may be combined from two eyes 116 of a user 102 to estimate a gaze point (i.e., a 3D location or position in the virtual scene where the user is looking), which may map to a location(s) on the display panel(s) 104 for predicting where the user 102 will be looking in terms of an individual subset (e.g., a row) or a group of contiguous subsets (e.g., a group of contiguous rows) of the pixels of the display panel(s) 104. For example, eye tracking system 528 may integrate information from past measurements, measurements identifying a position of a user's 102 head, and 3D information describing a scene presented by electronic display(s) 516. Thus, information for the position and orientation of the user's 102 eyes 116 is used to determine the gaze point in a virtual scene presented by HMD 500 where the user 102 is looking, and to map that gaze point to a location(s) on the display panel(s) 104 of the HMD 100. As mentioned earlier, a most recent estimate/prediction of a gaze point(s) or a location(s) on the display panel(s) 104 where the user 102 is looking may be used as a proxy for predicting where the user 102 will be looking during a forthcoming illumination time period 120 for a given frame 108. However, other techniques for predicting where the user 102 will be looking in the future may be utilized, such as utilizing motion vectors to predict a trajectory of eye movement, and the like.

The HMD 500 may further include a head tracking system 530. The head tracking system 530 may leverage one or more of the sensor 524 to track head motion, including head rotation, of the user 102, as described above. For example, the head tracking system 530 can track up to six degrees of freedom of the HMD 500 (i.e., 3D position, roll, pitch, and yaw). These calculations can be made at every frame 108 of a series of frames 108 so that the application 106 can determine how to render a scene in the next frame 108 in accordance with the head position and orientation. In some embodiments, the head tracking system 530 and/or the compositor 114 using the head tracking system 530 is configured to predict a future pose (position and/or orientation) of the HMD 500 based on current and/or past data, and/or based on the known/implied scan out latency of the individual subsets of pixels in a display system that implements a rolling band display driving technique, as described herein. This is because the application is asked to render a frame 108 before the user 102 actually sees the light (and, hence, the image) on the display(s) 516. Accordingly, a next frame 108 can be rendered based on this future prediction of head position and/or orientation that was made at an earlier point in time, which may be roughly within the range of 12-30 milliseconds (ms) prior to rendering the frame 108, depending on the target render time 200 determined for the given frame 108. Rotation data provided by the head tracking system 530 can be used to determine both direction of HMD 500 rotation, and amount of MID 500 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 500.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A head-mounted display (HMD) system comprising:
   a HMD including a display panel having an array of pixels;
   an eye tracking system;
   a head tracking system;
   a processor; and
   memory storing computer-executable instructions that, when executed by the processor, cause the HMD system to:
   predict, based at least in part on eye tracking data generated by the eye tracking system, a location on the display panel where a user wearing the HMD will be looking during an illumination time period, wherein individual subsets of the pixels are illuminated in sequence over the illumination time period to present an image on the display panel;
   determine a time, within the illumination time period, at which an individual subset of the pixels that corresponds to the location on the display panel will be illuminated;
   predict, based at least in part on head tracking data generated by the head tracking system, a pose that the HMD will be in at the time;
   send pose data indicative of the pose to an application for rendering a frame corresponding to the image;
   receive, from the application, pixel data for the frame;
   apply re-projection adjustments to the pixel data for the frame to obtain modified pixel data associated with a re-projected frame; and
   present the image on the display panel based at least in part on the modified pixel data, wherein the individual subsets of the pixels are illuminated in the sequence over the illumination time period during presentation of the image on the display panel.

2. The HMD system of claim 1, wherein:
   the pixels of the array of pixels are arranged in rows and columns;
   the individual subsets of the pixels correspond to individual rows of the pixels; and
   the sequence in which the individual rows of the pixels are illuminated is from top-to-bottom.

3. The HMD system of claim 1, wherein predicting the location is further based on a field of view (FOV) parameter of the HMD.

4. The HMD system of claim 1, wherein applying the re-projection adjustments to the pixel data to obtain modified pixel data comprises:
   predicting, based at least in part on second head tracking data generated by the head tracking system, a plurality of updated poses of the HMD for a plurality of times, within the illumination time period, at which the individual subsets of the pixels will be illuminated;
   calculating a plurality of adjustments based at least in part on comparisons between the pose and individual ones of the updated poses; and
   modifying the pixel data for the frame based at least in part on the plurality of adjustments to obtain the modified pixel data associated with the re-projected frame.

5. The HMD system of claim 4, wherein:
   the plurality of adjustments include:
      a first adjustment for a first individual subset of the pixels that is adjacent to the individual subset of the pixels that corresponds to the location on the display panel; and
      a second adjustment for a second individual subset of the pixels that is not adjacent to the individual subset of the pixels that corresponds to the location on the display panel; and
   the first adjustment is less than the second adjustment.

6. The HMD system of claim 1, wherein:
   the display panel is a first display panel of a pair of display panels that includes the first display panel and a second display panel; and
   the image is a first image of a pair of images that are presented on the pair of display panels based at least in part on the pixel data.

7. A method implemented by a head-mounted display (HMD) system that includes a display panel having an array of pixels, the method comprising:
   predicting, based at least in part on eye tracking data generated by an eye tracking system of the HMD system, a location on the display panel where a user wearing a HMD will be looking during an illumination time period, wherein individual subsets of the pixels are illuminated in sequence over the illumination time period to present an image on the display panel;
   determining a time, within the illumination time period, at which an individual subset of the pixels that corresponds to the location on the display panel will be illuminated;
   predicting, based at least in part on head tracking data generated by a head tracking system of the HMD system, a pose that the HMD will be in at the time;
   sending pose data indicative of the pose to an application for rendering a frame corresponding to the image;
   receiving, from the application, pixel data for the frame;
   applying re-projection adjustments to the pixel data for the frame to obtain modified pixel data associated with a re-projected frame; and
   presenting the image on the display panel based at least in part on the modified pixel data, wherein the individual subsets of the pixels are illuminated in the sequence over the illumination time period during presentation of the image on the display panel.

8. The method of claim 7, wherein the applying of the re-projection adjustments to the pixel data for the frame to obtain the modified pixel data associated with the re-projected frame comprises:
predicting, based at least in part on second head tracking data generated by the head tracking system, a plurality of updated poses of the HMD for a plurality of times, within the illumination time period, at which the individual subsets of the pixels will be illuminated;
calculating a plurality of adjustments based at least in part on comparisons between the pose and individual ones of the updated poses; and
modifying the pixel data for the frame based at least in part on the plurality of adjustments to obtain the modified pixel data associated with the re-projected frame.

9. The method of claim 8, wherein:
the plurality of adjustments include:
a first adjustment for a first individual subset of the pixels that is adjacent to the individual subset of the pixels that corresponds to the location on the display panel; and
a second adjustment for a second individual subset of the pixels that is not adjacent to the individual subset of the pixels that corresponds to the location on the display panel; and
the first adjustment is less than the second adjustment.

10. The method of claim 7, wherein:
the eye tracking data indicates that the user is looking at the location of the display panel; and
the predicting of the location on the display panel where the user will be looking during the illumination time period comprises using the location of the display panel where the user is looking as a proxy for predicting where, on the display panel, the user will be looking during the illumination time period.

11. The method of claim 7, wherein:
the pixels of the array of pixels are arranged in rows and columns;
the individual subsets of the pixels correspond to at least one of individual rows of the pixels or individual groups of contiguous rows of the pixels; and
the sequence in which the individual subsets of the pixels are illuminated is from top-to-bottom.

12. The method of claim 7, wherein the eye tracking data indicates an eye orientation of the user, and wherein the location is predicted as a nearest subset of pixels relative to the eye orientation of the user.

13. The method of claim 7, wherein:
the display panel is a first display panel of a pair of display panels that includes the first display panel and a second display panel; and
the image is a first image of a pair of images that are presented on the pair of display panels based at least in part on the pixel data.

14. The method of claim 7, wherein the HMD is a virtual reality (VR) headset.

15. The method of claim 7, wherein predicting the location is further based on a field of view (FOV) parameter of the HMD.

16. A head-mounted display (HMD) system comprising:
a HMD including a display panel having an array of pixels;
an eye tracking system;
a head tracking system;
a processor; and
memory storing computer-executable instructions that, when executed by the processor, cause the HMD system to:
predict, based at least in part on eye tracking data generated by the eye tracking system, a gaze point where a user wearing the HMD will be looking during an illumination time period, wherein individual subsets of the pixels are illuminated in sequence over the illumination time period to present an image on the display panel;
determine an individual subset of the pixels that corresponds to the gaze point;
predict, based at least in part on head tracking data generated by the head tracking system, a pose that the HMD will be in at a time, within the illumination time period, at which the individual subset of the pixels will be illuminated;
send pose data indicative of the pose to an application for rendering a frame corresponding to the image;
receive, from the application, pixel data for the frame;
apply re-projection adjustments to the pixel data for the frame to obtain modified pixel data associated with a re-projected frame; and
present the image on the display panel based at least in part on the modified pixel data, wherein the individual subsets of the pixels are illuminated in the sequence over the illumination time period during presentation of the image on the display panel.

17. The HMD system of claim 16, wherein applying the re-projection adjustments to the pixel data for the frame to obtain the modified pixel data associated with the re-projected frame comprises:
predicting, based at least in part on second head tracking data generated by the head tracking system, a plurality of updated poses of the HMD for a plurality of times, within the illumination time period, at which the individual subsets of the pixels will be illuminated;
calculating a plurality of adjustments based at least in part on comparisons between the pose and individual ones of the updated poses; and
modifying the pixel data for the frame based at least in part on the plurality of adjustments to obtain the modified pixel data associated with the re-projected frame.

18. The HMD system of claim 16, wherein:
the pixels of the array of pixels are arranged in rows and columns;
the individual subsets of the pixels correspond to at least one of individual rows of the pixels or individual groups of contiguous rows of the pixels;
the sequence in which the individual subsets of the pixels are illuminated is from top-to-bottom; and
determining the individual subset of the pixels that corresponds to the gaze point comprises estimating at least one of an individual row of the pixels or an individual group of contiguous rows of the pixels where the user will be looking.

19. The HMD system of claim 16, wherein the HMD is a virtual reality (VR) headset.

20. The HMD system of claim 16, wherein:
the eye tracking data indicates the gaze point where the user is looking; and
predicting the gaze point where the user will be looking during the illumination time period comprises using the gaze point where the user is looking as a proxy for predicting where the user will be looking during the illumination time period.

* * * * *